US011369864B2

(12) United States Patent
Zuniga et al.

(10) Patent No.: US 11,369,864 B2
(45) Date of Patent: Jun. 28, 2022

(54) INTERACTIVE VIDEO GAME WITH TOYS HAVING IN INTERCHANGEABLE PARTS

(71) Applicant: Activision Publishing, Inc., Santa Monica, CA (US)

(72) Inventors: Leo Zuniga, Albany, NY (US); Jeremy Russo, Albany, NY (US); Brent Gibson, Albany, NY (US); Eric Feurstein, Albany, NY (US); Robert Leyland, Novato, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 2755 days.

(21) Appl. No.: 13/721,710

(22) Filed: Dec. 20, 2012

(65) Prior Publication Data

US 2014/0179446 A1 Jun. 26, 2014

(51) Int. Cl.
*A63F 9/24* (2006.01)
*A63H 3/00* (2006.01)
(Continued)

(52) U.S. Cl.
CPC ............... *A63F 9/24* (2013.01); *A63F 13/42* (2014.09); *A63F 13/65* (2014.09); *A63F 13/98* (2014.09);
(Continued)

(58) Field of Classification Search
CPC ............ A63H 3/16; A63H 3/003; A63H 3/26; A63H 2200/00; A63F 9/24; A63F 9/42; A63F 9/65; A63F 9/98
(Continued)

(56) References Cited

U.S. PATENT DOCUMENTS

| 4,136,480 | A | * | 1/1979 | Fabricant | ................. A63F 9/10 273/157 R |
| 4,869,701 | A | * | 9/1989 | Kawai | ..................... A63H 3/16 273/156 |

(Continued)

OTHER PUBLICATIONS

International Search Report on related PCT Application No. PCT/US2013/076219 from International Searching Authority (KIPO) dated Apr. 10, 2014.

(Continued)

*Primary Examiner* — Kang Hu
*Assistant Examiner* — Wei Lee
(74) *Attorney, Agent, or Firm* — Klein, O'Neill & Singh, LLP

(57) ABSTRACT

A video game includes a peripheral device that senses the presence and identity of physical toys and/or toy parts near or on the peripheral device. Each of the toy parts and toys includes an identification device such as an RFID tag. Each of the toys parts may be combined to form a toy assembly which may be associated with a corresponding game character or object. The toy parts included in a toy assembly may store information about the status of the corresponding character or object in the game, for example, a name of characters configured using the toy part, a score, a number of times the toy part has been used, and/or a video game level achieved during video game play by a video game character associated with the toy part. The information about the toy part and configured toy assembly may be updated during game play.

7 Claims, 9 Drawing Sheets

(51) Int. Cl.
*A63F 13/42* (2014.01)
*A63H 33/26* (2006.01)
*A63F 13/98* (2014.01)
*A63F 13/65* (2014.01)

(52) U.S. Cl.
CPC ............ *A63H 3/003* (2013.01); *A63H 33/26* (2013.01); *A63H 2200/00* (2013.01)

(58) Field of Classification Search
USPC ...................................... 463/36, 47
See application file for complete search history.

(56) References Cited

U.S. PATENT DOCUMENTS

| | | | |
|---|---|---|---|
| 5,746,638 A | 5/1998 | Shiraishi | |
| 5,766,077 A * | 6/1998 | Hongo | A63F 13/02 463/30 |
| 6,290,565 B1 * | 9/2001 | Galyean, III | A63H 3/16 273/148 B |
| 6,306,036 B1 | 10/2001 | Burns et al. | |
| 6,361,396 B1 | 3/2002 | Snyder et al. | |
| 6,471,565 B2 | 10/2002 | Simeray | |
| 6,575,810 B1 | 6/2003 | Sohn | |
| 6,705,794 B2 | 3/2004 | Varner et al. | |
| 6,722,941 B2 | 4/2004 | Dowd et al. | |
| 6,773,322 B2 | 8/2004 | Gabai et al. | |
| 6,839,035 B1 | 1/2005 | Addonisio et al. | |
| 6,893,315 B2 | 5/2005 | Barri | |
| 7,144,179 B2 | 12/2006 | Varner et al. | |
| 7,311,526 B2 | 12/2007 | Rohrbach et al. | |
| 7,325,996 B2 | 2/2008 | Varner et al. | |
| 7,384,325 B2 | 6/2008 | Kelly et al. | |
| 7,520,793 B2 | 4/2009 | Pillai et al. | |
| 7,641,477 B2 | 1/2010 | DiFonzo et al. | |
| 7,696,884 B2 | 4/2010 | Luo et al. | |
| 7,862,428 B2 | 1/2011 | Borge | |
| 7,873,388 B2 | 1/2011 | Doi et al. | |
| 7,963,818 B2 | 6/2011 | Fullerton et al. | |
| 8,077,044 B2 | 12/2011 | Nikitin et al. | |
| 8,079,890 B2 | 12/2011 | Seligman | |
| 8,127,408 B2 | 3/2012 | Wiseman | |
| 2004/0106455 A1 * | 6/2004 | Shinoda | G06Q 20/341 463/43 |
| 2006/0030410 A1 | 2/2006 | Stenton et al. | |
| 2007/0015582 A1 * | 1/2007 | Ha | A63F 13/12 463/40 |
| 2008/0081694 A1 * | 4/2008 | Hong | A63F 13/02 463/34 |
| 2009/0137323 A1 * | 5/2009 | Fiegener | A63H 3/28 463/43 |
| 2009/0197658 A1 * | 8/2009 | Polchin | A63F 13/02 463/9 |
| 2011/0098092 A1 | 4/2011 | Reiche, III | |
| 2011/0159963 A1 * | 6/2011 | Link | A63F 13/69 463/40 |
| 2012/0190452 A1 | 7/2012 | Weston et al. | |
| 2012/0208638 A1 | 8/2012 | Barney et al. | |
| 2012/0295703 A1 | 11/2012 | Reiche et al. | |
| 2012/0295704 A1 | 11/2012 | Reiche et al. | |
| 2013/0069305 A1 * | 3/2013 | Lee | A63F 9/10 273/156 |
| 2014/0162785 A1 * | 6/2014 | Reiche | A63F 13/12 463/35 |

OTHER PUBLICATIONS

Written Opinion on related PCT Application No. PCT/US2013/076219 from International Searching Authority (KIPO) dated Apr. 10, 2014.

* cited by examiner

INTERACTIVE VIDEO GAME WITH TOYS HAVING IN INTERCHANGEABLE PARTS

BACKGROUND OF THE INVENTION

The present invention relates generally to video games and, more particularly, to a video game and a toy used in connection with the video game, where the toy has functionality responsive to events or achievements in the video game.

Video games provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a role or activity being a fantasy.

Video games, being generally provided by way of an electronic device and associated display, often lack a physical component by which a player may touch and hold a representative object associated with video game play or otherwise have a physical object representative of video game play. Despite the sometimes intense graphics action of various video games, the game play experience remains two dimensional. Merely interacting with a displayed simulated environment may not allow game players to fully relate to game play, with a sharply distinct separation between a game play world and the world physically inhabited by the game players.

BRIEF SUMMARY OF THE INVENTION

In accordance with aspects of the invention, a plurality of toy parts may be connected, combined or assembled together to form a toy assembly. The toy assembly and/or individual toy parts may be configured to communicate with a gaming platform, such as a computer, game console, or mobile device. The toy assembly may communicate with the gaming platform, either directly or via a peripheral device. In some embodiments, a software program running on the gaming platform may be used to identify the individual toy parts and determine the corresponding toy assembly. The gaming platform then displays graphically a virtual representation of the toy assembly comprised of the toy parts assembled or combined together. The virtual representation may be displayed in a virtual environment on a display device associated with the gaming platform, such as a monitor, television or device screen. The toy parts may interact dynamically with the software program so that the virtual representation of the toy on the display device corresponds to the physical appearance of the toy assembly. The user can interchange toy parts with a contemporaneous graphical display of the virtual representation. Accordingly, a user can affect the appearance and interaction between the virtual character and the virtual environment by modifying the physical toy parts and accessory parts.

In some embodiments, each toy part may be configured with an identification tag, such as an RFID tag with a numeric or alphanumeric code providing an identification of the toy part. Each toy part may communicate with the gaming platform, either directly, via a peripheral or via other toy parts or any combination thereof, to provide the gaming platform with the identification information in the tag. For example, in some embodiments, a peripheral is in communication with the gaming platform. The toy assembly comprising the plurality of toy parts may be placed on or in proximity of the peripheral. The toy part closest to the peripheral may include an antenna for communicating with the peripheral. The other toy parts comprising the toy assembly may communicate with the toy part closes to the peripheral either through wireless transmission or wired transmission.

In some embodiments, each toy part includes a rewritable memory. Information relating to the toy part may be stored in the memory. For example, information pertaining to the ownership of the toy part, the use of the toy part in connection with one or more gaming platforms or attributes of the to part within the virtual environment may be stored in the memory. For example, as the user uses the toy part in connection with playing a video game on a gaming platform, data relating to accomplishments and challenges overcome by the user in the video game may be stored in the memory of the toy part. As another example, the user may be given opportunities to modify certain virtual attributes associated with one or more toy parts as he or she plays the video game. The stored information may be used in subsequent gaming sessions and across various gaming platforms so that the virtual attributes of each toy part and each accessory part persist.

In some embodiments, to parts may comprise accessories. For example, a toy part may be a weapon, clothing item, hat, shield, armor, shoes or other accessories that may be connected, attached, interlocked with or otherwise combined with a toy assembly having one or more parts.

One aspect of the invention provides a video game system comprising: a game device having an input device and a processor for executing program code for providing a videogame; a plurality of physical parts which are physically combinable to form a toy assembly, the plurality of physical parts including memory providing a unique identification of each physical part and configured to communicate said unique identification to said game device; said program code having instructions for providing a graphical display of a virtual character representing said toy assembly based on said unique identifications communicated from said plurality of physical parts; said program code further having instructions for providing a virtual environment for said virtual character; wherein movement and actions of said virtual character within said virtual environment are controllable by way of inputs received by said input device independently of communication with said toy assembly.

Another aspect of the invention provides a computer-implemented method for use in providing a video game, comprising: receiving information from a plurality of toy parts coupled together to form a toy assembly; determining a configuration of the toy assembly based on the information from the plurality of toy parts; displaying a virtual character corresponding to the toy assembly for use in the video game based on the determined configuration: and conducting video game play using the virtual character.

Another aspect of the invention provides a video game system, comprising: a game device including a processor, memory storing program instructions for providing for video game play, and a user input device; a peripheral device including a surface for placing objects thereon, the peripheral device including a wireless transceiver for communicating with objects placed on the surface, the peripheral device communicatively couplable to the game device; and a plurality of toy parts physically combinable into a toy assembly, the toy parts each including an identification of the to part, at least one of the toy parts including a wireless transceiver for communicating with the peripheral device, at least some of the other of the toy parts including communication elements for communicating with various of the toy parts such that each of the toy parts may communicate their identification to the toy part including the wireless transceiver when combined into the toy assembly; the program instructions for providing for video game play including program instructions for determining if the toy assembly is configured in a valid configuration, program instructions for commanding display of a character representing the toy assembly in game play, the character controllable by a user operating the user input device.

These and other aspects of the invention are more fully comprehended upon review of this disclosure.

DETAILED DESCRIPTION

Figure 1:
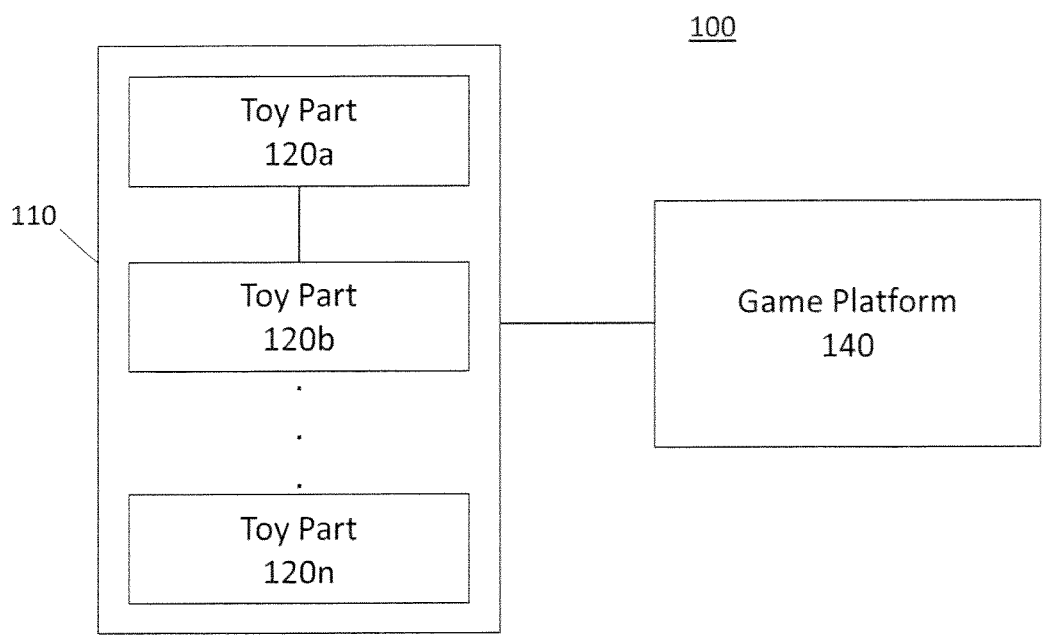
FIG. 1 is a block diagram illustrating an example of a video game system in accordance with aspects of the present invention.

FIG. 1 is a block diagram illustrating an example of a video game system in accordance with aspects of the present invention. Referring to FIG. 1, the video game system 100 includes game system 140 and a toy assembly comprised of a plurality of component toy parts 120*a-n*. The toy parts may be physically combined, coupled, connected or otherwise adjoined to create a toy assembly. In some embodiments, the toy parts may be coupled in an interlocked fashion to create a toy assembly, for example via a physical locking mechanism, electromagnetic or other locking mechanism. In various embodiments the toy parts 120*a-n* may be connected by a force, for example a physical or electromagnetic force, such as by way of interlocking physical components, frictional fittings, or magnetic couplings, or by way of other known connections.

Each of the toy parts 120*a-n* may include a rewriteable data storage component, such as RAM or rewritable REID tag. The memory or tag may store data reflecting the identification of the toy part. In addition, in various embodiments the memory may store other data corresponding to a portion of a character or other object within the game executed on game platform 140 which the toy part represents. The other data may include data such as strength, experience, wealth, health, ownership, achievements, activity level, use or other game play data of the portion of the character or other object. For example, if the toy part corresponds to an arm of a character in game play, the memory of the toy part may store information regarding strength or health of the arm. In some embodiments the memory may store other data, for example the other data mentioned above, with respect to a character or object as a whole, and in some embodiments all toy parts which in combination correspond to the character or object may store some or all of such information. The memory may be rewritable so that the stored attributes and characteristics of the toy parts may be updated during each game session and utilized in subsequent game sessions.

The game platform 140 is a system for executing game software and in various embodiments may comprise a device such as a personal computer, laptop, tablet, game console, portable game platform, or mobile device, or in some embodiments one or more devices in communication with one or more servers. In some embodiments the game platform 140 comprises a processor for executing program instructions providing for game play and associated circuitry, a video game controller 180, a display device 170, and in some embodiments a peripheral device (not shown in FIG. 1) for communicating with a toy or toy parts.

The game platform 140 may connect or be coupled to a display device or have a display device integrated with or within the game platform for displaying graphics associated with the game operating on the game platform 140. The instructions providing for game play may be stored on removable media, for example, an optical disk or cartridge, or otherwise stored in memory of the game platform. Accordingly, the game platform, for example a game console, may include an optical drive, for example, a DVD-ROM drive, for reading the instructions for game play. In other embodiments, the instructions providing for game play may be stored in a remote server that are accessed by a game platform, for example a computer, PC, game console, or mobile device. In yet other embodiments, the instructions providing for game play may be stored locally in the game device memory.

The toy parts 120*a-n* may communicate with game platform 140 directly or via a peripheral device. In some embodiments a first toy part 120*a* may communicate information to second toy part 120*b* and the second toy part 120*b* may communicate information relating to both first toy part 120*a* and second toy part 120*b* to game platform 140, either directly or via peripheral 130 as depicted in FIG. 1. Similarly, in some embodiments multiple toy parts may communicate information to the second toy part, either directly or through one or more intervening toy parts, with the second toy part communicating information to the game platform, either directly or through the peripheral. In alternative embodiments, the toy parts 120*a-n* communicate with game platform 140 independently.

Figure 2:
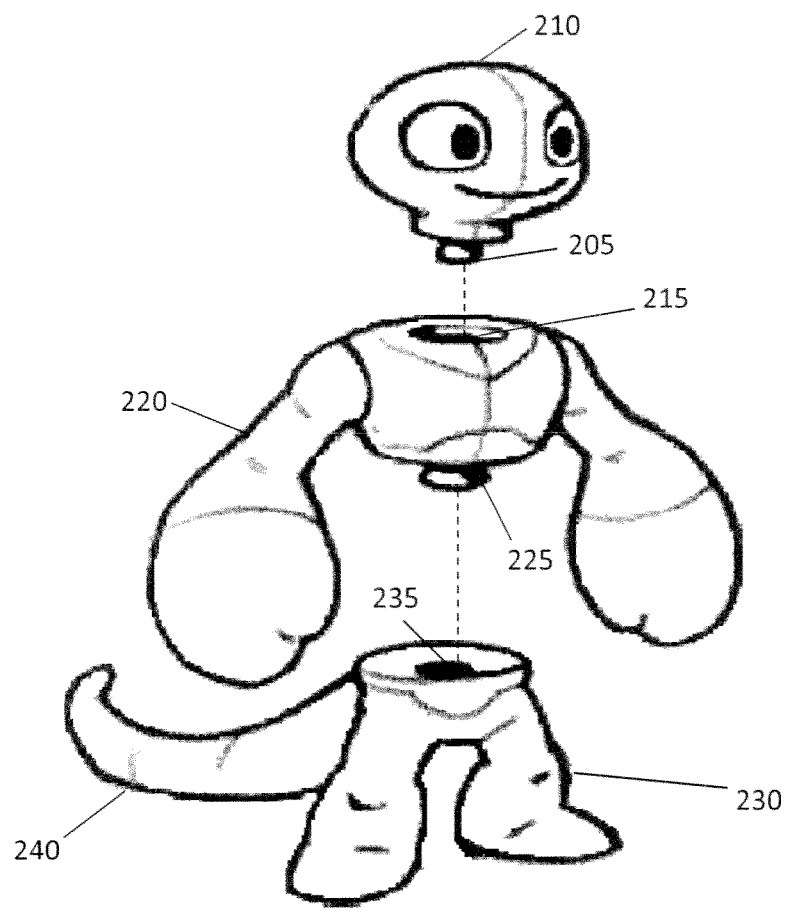
FIG. 2 depicts an example of a toy assembly for use in conducting a video game in accordance with aspects of the present invention.

FIG. 2 depicts an example of a toy assembly for use in conducting a video game in accordance with aspects of the present invention. Referring to FIG. 2, a toy assembly 200 is configured as a fantasy toy figure. Of course, the toy assembly 200 could instead be configured as an action figure, robot figure, a vehicle, building sets, or other toy figure, in most embodiments using different appropriate toy parts. The toy assembly 200 of FIG. 2 includes three to parts: a head 210, a torso 220, and legs 230. Although three toy parts are shown, the number and type of toy parts are exemplary only and should not be considered as limiting. For example, the arms included in torso 220 and the tail 240 included in the legs 230 may also be provided as separate toy parts. As another example, head 210 may be part of torso 220, in which case toy assembly 200 would include only two toy parts.

Each of the different toy parts may be part of a class of toy parts for use in various toy assemblies. In some embodiments, a toy assembly may be configured according to preference using a plurality of interchangeable head parts, a plurality of interchangeable torso parts, and a plurality of interchangeable leg parts. For example, the head 210 may be replaced with a different head, for example an elephant ad, to create a character having a different head with the same torso 220 and legs 230. Other combinations of parts from the various categories of parts may be utilized. In some embodiments, the toy parts comprise accessories or other objects to be used by the toy character. For example, a toy part may comprise a weapon, shield, tool, clothing, accoutrements or other item.

The toy parts may be physically combined, coupled, connected or otherwise adjoined to create a toy assembly. In some embodiments, the toy parts may be coupled in an interlocked fashion to create a toy assembly, for example via a physical locking mechanism, electromagnetic mechanism or other locking mechanism. As shown in FIG. 2, the head 210 includes a connector 205 which may be received in receptacle 215 of the torso 220 to couple head 210 to the torso 220. Torso 220 includes a connector 225 which may be received in receptacle 235 of the legs to couple the torso 220 to the legs 230.

In some embodiments, the connectors for each of the toy parts may be configured so as to restrict connection of toy parts, for example, to restrict use of a head toy part to replace a legs toy part.

Each to part includes machine-readable information, for example, memory, a radio frequency identification (RFID) tag or a barcode. The machine-readable information may be sensed, read, and/or in some embodiments written, directly by a game console, or in some embodiments indirectly by way of sending data and commands to the toy to write the data to memory of the toy parts. The machine-readable information may include a numeric identifier. In some embodiments, the communication with the toy may be conducted via a peripheral such as a peripheral or other reader. The machine-readable information allows the reader, or the processor of the game console, to distinguish one toy part from other toy parts, and the machine-readable information may therefore be considered to include a toy part identifier, and in some embodiments, each particular toy part may have its own distinct identifier. In addition, in some embodiments the machine readable information includes additional information related to player achievement in a video game when the part is in use.

Figure 3:
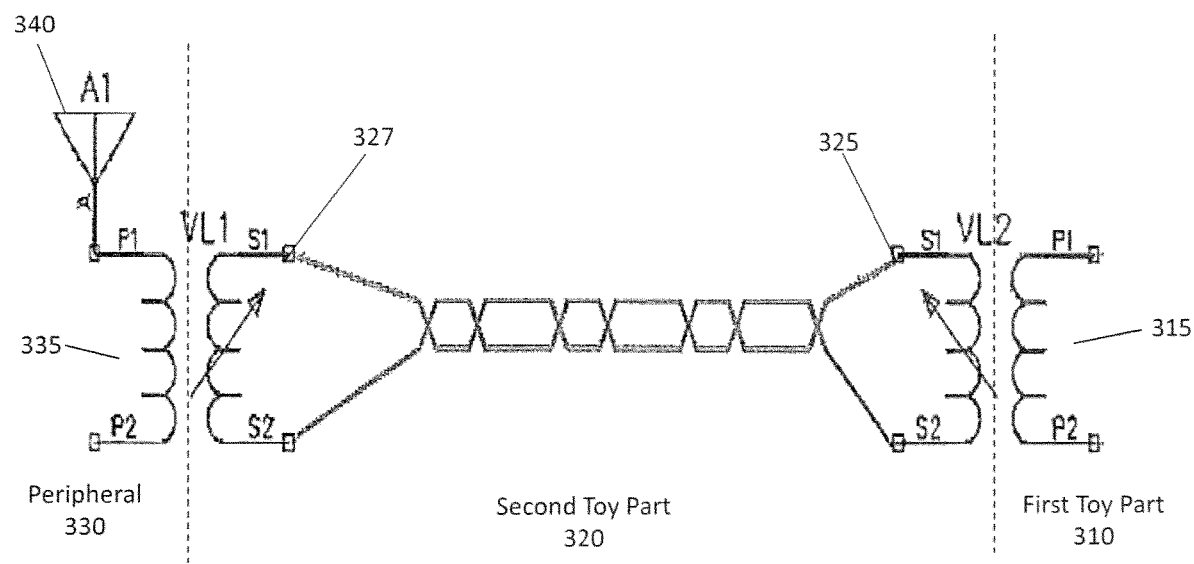
FIG. 3 is a diagram depicting electronic components toy parts in accordance with aspects of the present invention.

FIG. 3 is a diagram depicting an embodiment of the electronic components of toy parts in connection with the present invention. First toy part 310 comprises an RFID tag 315. RFID tag 315 utilizes a wireless system that uses radio-frequency electromagnetic fields to transfer data from (and in various embodiments to) the tag coupled, for example for purposes of automatic identification and tracking. Some tags require no battery and are powered by the electromagnetic fields used to read them. Others use a local power source and emit radio waves (electromagnetic radiation at radio frequencies).

RFID tag 315 contains numerical information for identifying first toy part 310. First toy part 310 may be physically coupled to a second toy part 320. Second toy part 320 includes a circuit 325, for example an inductor circuit, for receiving the RFID electromagnetic field from RFID tag 315 in first toy part 310. When first toy part 310 and second toy part 320 are sufficiently proximate to one another or in contact with one another, the numerical information in RFID tag 315 is transmitted to the inductor circuit 325. Inductor circuit 325 is electronically coupled to an interface 327, such as a near field transmitter in second to part 320. Interface 327 communicates with peripheral 330. The near field transmitter may also be an RFID tag, in some embodiments.

The peripheral 330 includes a radio-frequency interface 335 to communicate with toys and/or toy parts. In many embodiments, the radio-frequency interface is an RFID interface. In other embodiments, the peripheral may include a different interface for communicating with toys, such as an optical interface or a wired interface. Further in some embodiments the toy may include a wired connection to the peripheral device, or in some embodiments, a wired connection to the game platform, possibly dispensing with the peripheral device. Similarly, in some embodiments the toy may include wireless communication capabilities of the type commonly used with computers, for example Bluetooth, NFC or Wi-Fi capabilities. The peripheral 330 may then transmit the information received from RFID tag 315 associated with first toy part 310 and information received from an RFID tag in second toy part 320 to a game platform utilizing antenna 340.

Figure 4:
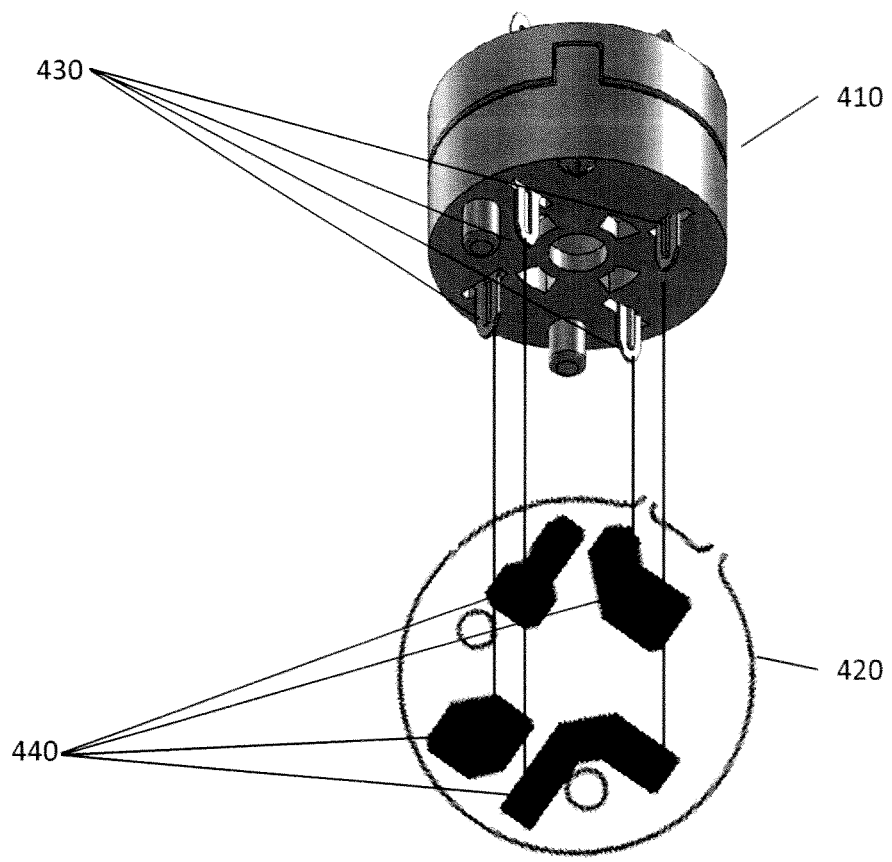
FIG. 4 is a diagram depicting electronic components of toy parts in accordance with aspects of the present invention.

FIG. 4 is a diagram depicting an embodiment of the electronic components of parts in connection with the present invention. First toy part 410 comprises an RFID tag or a storage device. The RFID tag contains numerical information for identifying first toy part 410. First toy part 410 may be physically coupled to second to part 420. First toy part 410 includes one or more plugs or connectors 430 that fit into a receptacle(s) 440 on second toy part 420. In some embodiments, the connector(s) 430 and receptacle(s) 440 may be used to provide an electrical connection between the two toy parts to enable the transmission of data between the connected toy parts. In some embodiments, the first toy part 410 and second toy part 420 may utilize magnetic connectors to maintain contact between the toy parts. For example, the first toy part 410 and second to part 420 may each have a magnetic element. When e connector(s) 430 and receptacle(s) 440 are brought into proximity, the magnetic attraction between the magnet and its complement, whether another magnet or a ferromagnetic material, maintains the toy parts in contact with one another. In embodiments in which the connectors are used to provide electrical connection between the toy parts, the magnetic elements may maintain the contacts in an electrically conductive relationship. When the connectors associated with first toy part 410 are in contact with receptacle associated with second toy part 420, data from a memory device or numerical information in an RFID tag in first toy part 410 may be transmitted to second toy part 420 for subsequent transmission to a game platform, and/or in some embodiments vice versa. In some embodiments, strength of transmitters for communication between the two toy parts is selected to be sufficiently low such that successful communication between the toy parts requires contact between the toy parts. Such a configuration may be beneficial, for example, to reduce or eliminate interference with other communications to the game platform or a peripheral, or receipt of extraneous communications by same.

Figure 5:
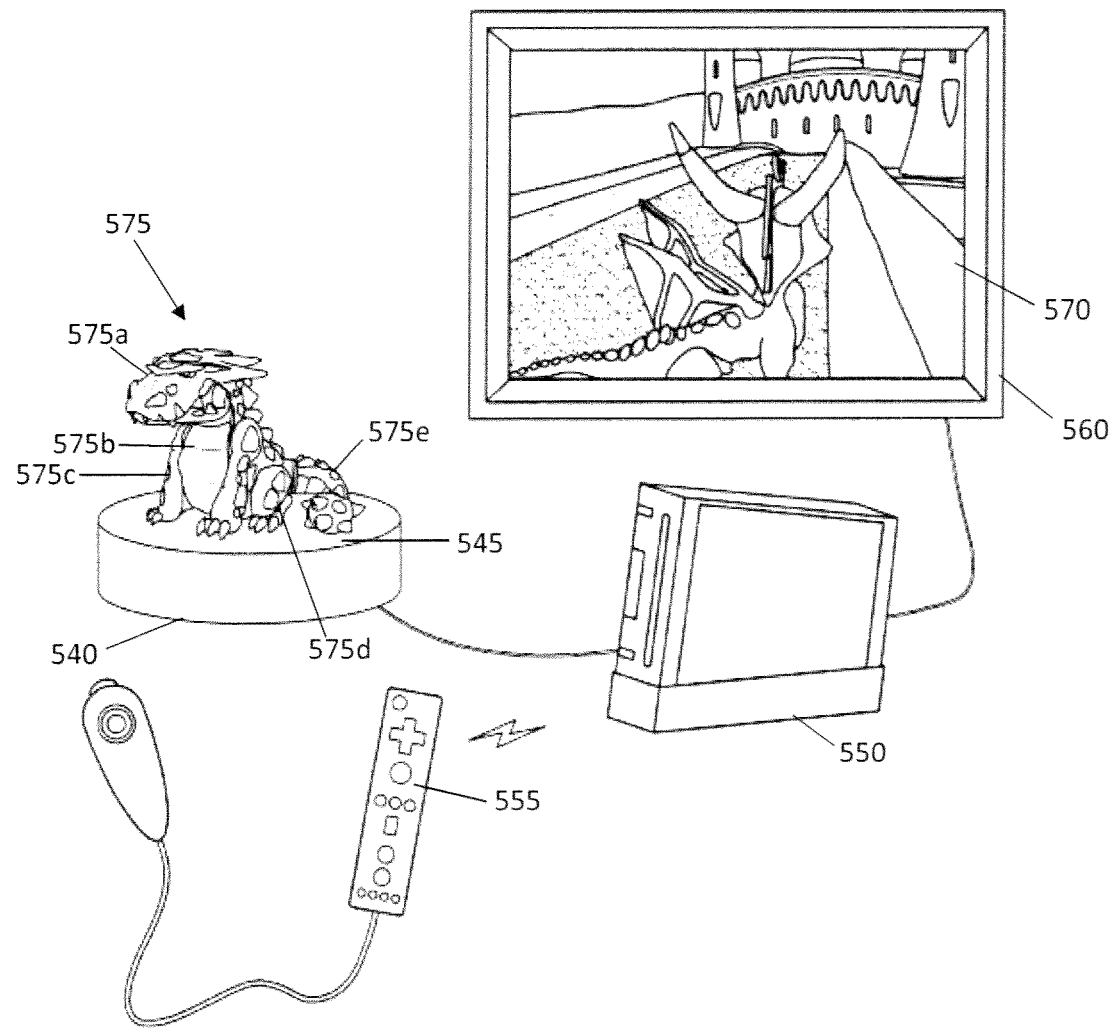
FIG. 5 illustrates an example of a video game system in accordance with aspects the invention.

FIG. 5 illustrates an example of a video game system in accordance with aspects of the invention. The video game system includes a game console 550 with a processor for executing program instructions providing for game play and associated circuitry, user input devices such as a game controller 555, a display device 560 for displaying game action, a peripheral device 540, and a toy assembly 575. Toy assembly 575 is comprised of a plurality of interconnected toy parts, including head part 575a, torso part 575b, arm parts 575c, leg parts 575d, and tail part 575e, each of which includes memory storing identification information.

The peripheral device 540 may provide the capability to read and write information to the toy assembly 575 and/or its component toy parts. The processor, responsive to inputs from the user input devices and the peripheral device, generally commands display on the display device of game characters in and interacting with a virtual world of game play and possibly each other. In addition, the processor, responsive to inputs from the peripheral device, may be used to add characters and objects to the virtual world, with the characters able to manipulate the added objects and move about the virtual world. For example, the processor may include characters in game play based on inputs from the peripheral device, and the processor may control actions and activities of game characters based on inputs from the user input devices.

The instructions providing for game play are generally stored on removable media, for example, an optical disk. Accordingly, the game console may include an optical drive, for example, a DVD-ROM drive, for reading the instructions for game play. In some embodiments the game console may be a personal computer, including similar internal circuitry as herein described, as well as, for example, a built-in display and built-in user input devices, such as a keyboard and a touch pad. In other embodiments, the instructions providing for game play may be stored in a remote server that are accessed by a computer or mobile device. In yet other embodiments, the instructions providing for game play may be stored locally in the game device memory.

The display device is generally coupled to the game platform by a cable, although in some embodiments a wireless connection may be used. In many embodiments, the display device is a liquid crystal display. In some embodiments, the display device is a television. In some embodiments, the display device is a cathode ray display, a plasma display, an electroluminescent display, an LED or OLED display, or other display. A display screen 570 of the display device displays video images of game play, generally as commanded by the processor or other associated circuitry of the game platform. In the embodiment of FIG. 5, the display screen shows a screen shot of video game play. As illustrated, the screen shot shows a display of a character, generally controlled by and animated in accordance with user inputs, approaching an inanimate item in the form of what may be considered a castle.

The peripheral device, in some embodiments and as shown in FIG. 5, has a substantially flat upper surface for placement of toys thereon. The game player generally places game toys, for example, toy assembly 575 in the form and representative of a dragon as shown in FIG. 5, on the flat surface of the peripheral device during game play. The toy assembly 575 is generally in the form of and representative of a game item such as a game character or other game item. In several embodiments, the toy assembly is associated with a game character during game play.

Peripheral 540 includes a surface 545 where toy assembly 575 may be placed. Peripheral 540 may be coupled with a game platform 550 either through a wired or wireless connection. Game platform 550 may be any form of game platform, such as game console (e.g., Xbox, Playstation, Wii, NDS), computer, mobile device or other device for executing game software either locally or from a server. The game platform 550 executes software for a video game. The game platform 550 may be connected to a display 560. In other embodiments, a display may be incorporated into the game platform 550, such as in mobile devices or portable computer devices.

The display 560 provides for the visual display of graphics associated with the game 570. A software program running on the game platform 550 allows the game platform 550 to identify the individual toy parts and determine the corresponding toy assembly 575. The game platform 550 then displays graphically a virtual representation of the toy assembly 575 comprised of the toy parts assembled or combined together. The virtual representation may be displayed in a virtual environment on a display device 560 associated with the game platform 550. The toy parts interact dynamically with the software program so that the virtual representation of the toy on the display device corresponds to the physical appearance of the toy assembly. The user can interchange toy parts with a contemporaneous graphical display of the corresponding virtual representation. Accordingly, a user can affect in real time the appearance and interaction between the virtual character and the virtual environment by modifying the physical toy parts and accessory parts.

A user may control the movements of the virtual character in the game using a controller 555. The controller 555 may be a separate from the game platform 550 or integrated therein.

Each toy part 575a-e may include a memory or tag for identifying the part. For example, in some embodiments, each part 575a-e includes an RFID tag with a numerical code to uniquely identify the part. The information pertaining to the identification of each part 575a-e may be communicated to the game platform 550 through the peripheral 540. In alternative embodiments, the toy parts 575a-e may communicate with the game platform 550 directly. In still other embodiments, the toy parts 575a-e may communicate with each other and provide combined information to the game platform 550 either directly or through a peripheral 540. In other embodiments, each toy part includes a rewritable memory. Information relating to the toy part may be stored in the memory. For example, information pertaining to the ownership of the toy part, the use of the toy part in connection with one or more game platforms, achievements accomplished in the game while using the toy part, or attributes of the toy part within the virtual environment may be stored and updated in the memory. For example, as the user uses the toy part in connection with playing a video game on a game platform, data relating to accomplishments and challenges overcome by the user in the video game may be stored in the memory of the toy part. As another example, the user may be given opportunities to modify certain virtual attributes associated with one or more toy parts as he or she plays the video game. The stored information may be used in subsequent game sessions and across various game platforms so that the virtual attributes of each toy part and each accessory part persist.

Figure 6:
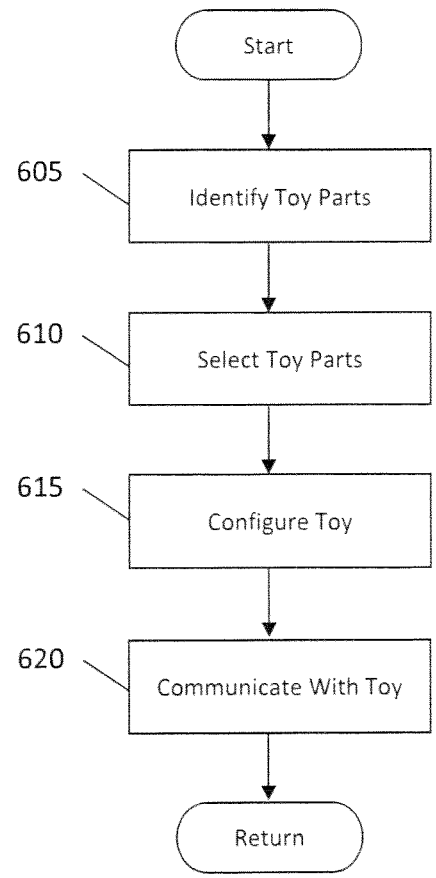
FIG. 6 is a flow diagram of a process for selecting and communicating with toy parts in accordance with aspects of the present invention.

FIG. 6 is a flow diagram of a process for selecting and communicating with toy parts in accordance with aspects of the present invention. In some embodiments the process is performed by a game platform, for example as discussed with respect to FIG. 1. At block 605, the process identifies toy parts. In some embodiments, the process may identify toy parts within a defined region. For example, the process may determine what toy parts are on the surface of a video game peripheral as shown in FIG. 5. In various embodiments, the toy parts may be identified by RFID, barcodes, QR-codes, or optical recognition. In one embodiment, identification of toy parts includes a video game peripheral reading identifiers of the toys and supplying the identifiers to a video game console.

In block 610, the process selects a toy part for communication. In some embodiments, the process may select multiple toy parts of a toy assembly for communication. The process may select the to part by transmitting a selection command having an identifier matching the identifier of the toy part. In many embodiments, the process expects to receive an acknowledgment of the selection from the toy part. When an acknowledgment not received, the process may retransmit the selection command or may signal a video game associated with the process that the selected toy is not available.

In block 615, the process configures a virtual character. The process may configure the virtual character based on the identified parts. In embodiments, the process may configure the virtual character based on configuration information indicating how the identified toy parts are connected. For example, the configuration information may include the identification of coupled toy parts and information regarding the connector and receptacle through which the toy parts are coupled.

In block 620, the process communicates with the toy parts. For example, the process may read from a particular memory location of the toy parts or may write to a particular memory location of the toy parts. In various embodiments the process communicates with the toy parts during game, for example communicates relating to presence of a corresponding virtual character in the game or changes to the states of the virtual character. In many embodiments, the process expects to receive an acknowledgment or response from the toy parts, and when not received, the process may retransmit the command or may signal the video game associated with the process that the selected toy part is not available. The process thereafter returns.

Figure 7:
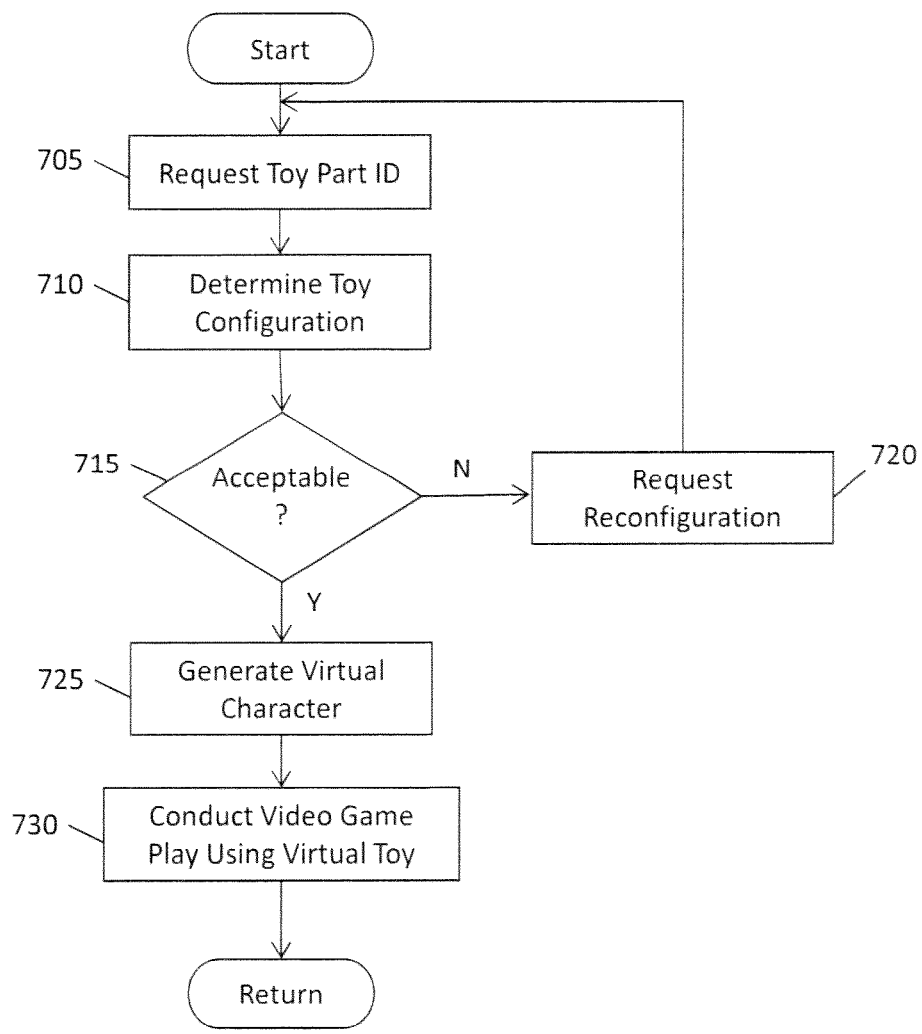
FIG. 7 is a flow diagram of a process for g video game play in accordance with aspects of the present invention.

FIG. 7 is a flow diagram of a process for conducting video game play in accordance with aspects of the present invention. In some embodiments the process is performed by a game platform, for example as discussed with respect to FIG. 1. In block 705, the process requests toy part identification. In some embodiments, the process may identify toy parts within a defined region. For example, the process may determine what toy parts are on the surface of a video game peripheral as shown in FIG. 5. In various embodiments, the toy parts may be identified by RFID, barcodes, QR-codes, or optical recognition. In one embodiment, identification of toy parts includes a video game peripheral reading identifiers of the toys and supplying the identifiers to a video game console.

In block 710, the process determines a toy configuration based on the toy part identifications. In some embodiments, the process may use a lookup table or other database to determine a configuration based on the toy parts identified. In some embodiments, the process may communicate with the toy parts to receive connection information indicating the other parts a particular toy part is connected to and an indication of which connector of the toy part is used to make such connection.

In block 715, the process determines if the toy configuration is acceptable. The process may utilize a set of configuration rules to determine whether a configuration is acceptable. In some embodiments, the process may determine acceptability of the toy configuration based on whether the toy assembly is complete. For example, the toy configuration may be deemed unacceptable if all of the receptacles of a torso part are not filled with a suitable toy part. In some embodiments, the toy configuration may be unacceptable if a toy part is not properly installed in a receptacle or has been inserted in an inappropriate receptacle. For example, the configuration may be deemed unacceptable if a tail part is installed in a receptacle configured to receive a head part.

If the toy configuration is not acceptable, at block 720, the process may request reconfiguration, for example by way of commanding presentation, by way of a display in some embodiments, to a use that the toy assembly be reconfigured. Thereafter the process returns to block 705.

When the toy configuration is deemed acceptable, at block 725, the process may generate a virtual character corresponding to a physical to assembly including each of the identified toy parts.

In block 730, the process conducts video game play using the virtual character. As the virtual toy is used to progress through the video game, data relating to accomplishments and challenges overcome by the user in the video game may be stored in the memory of the toy parts of the toy assembly.

Thereafter the process returns.

Figure 8:
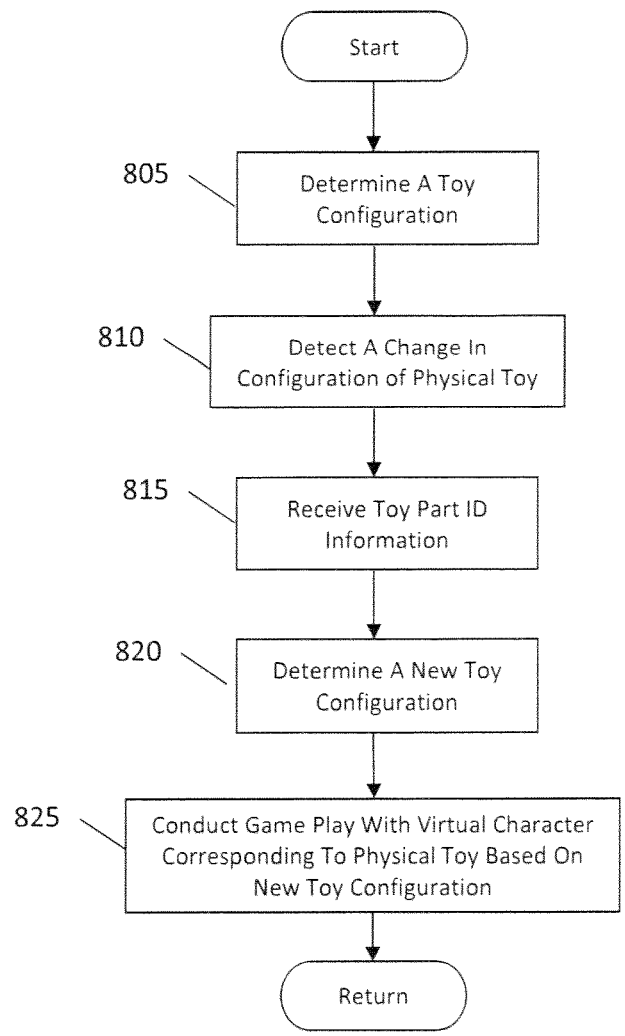
FIG. 8 is a flow diagram of a process for conducting video game play in accordance with aspects of the present invention.

FIG. 8 is a flow diagram of a process for conducting video game play in accordance with aspects of the present invention. In some embodiments the process is performed by a game platform, for example as discussed with respect to FIG. 1. In block 805, the process determines a toy configuration based on toy parts identified. In some embodiments, the process may use a lookup table or other database to determine a configuration based on the toy parts identified. In some embodiments, the process may communicate with the toy parts to receive connection information indicating the other parts a particular toy part is connected to and an indication of which connector of the toy part is used to make such connection.

In block 810, the process detects a change in the configuration of the physical toy. In some embodiments, a change may be detected when an identified toy part is removed from a defined area, for example, a surface of peripheral 550 shown in FIG. 5.

In block 815, the process may receive toy part identification information. In some embodiments, the process may identify toy parts located in a predefined region. In some embodiments, the process may determine the toy part identification only for the new toy parts added.

In block 820, the process may determine a new toy configuration. In some embodiments, the process may use a lookup table or other database to determine a configuration based on the toy parts identified including the new toy part(s). In some embodiments, the process may communicate with the toy parts to receive connectiion information indicating the other parts a particular toy part is connected to and an indication of which connector of the toy part is used to make such connection.

In block 825, the process may conduct game play with a virtual character corresponding to the new toy assembly. Thereafter, the process returns.

Figure 9:
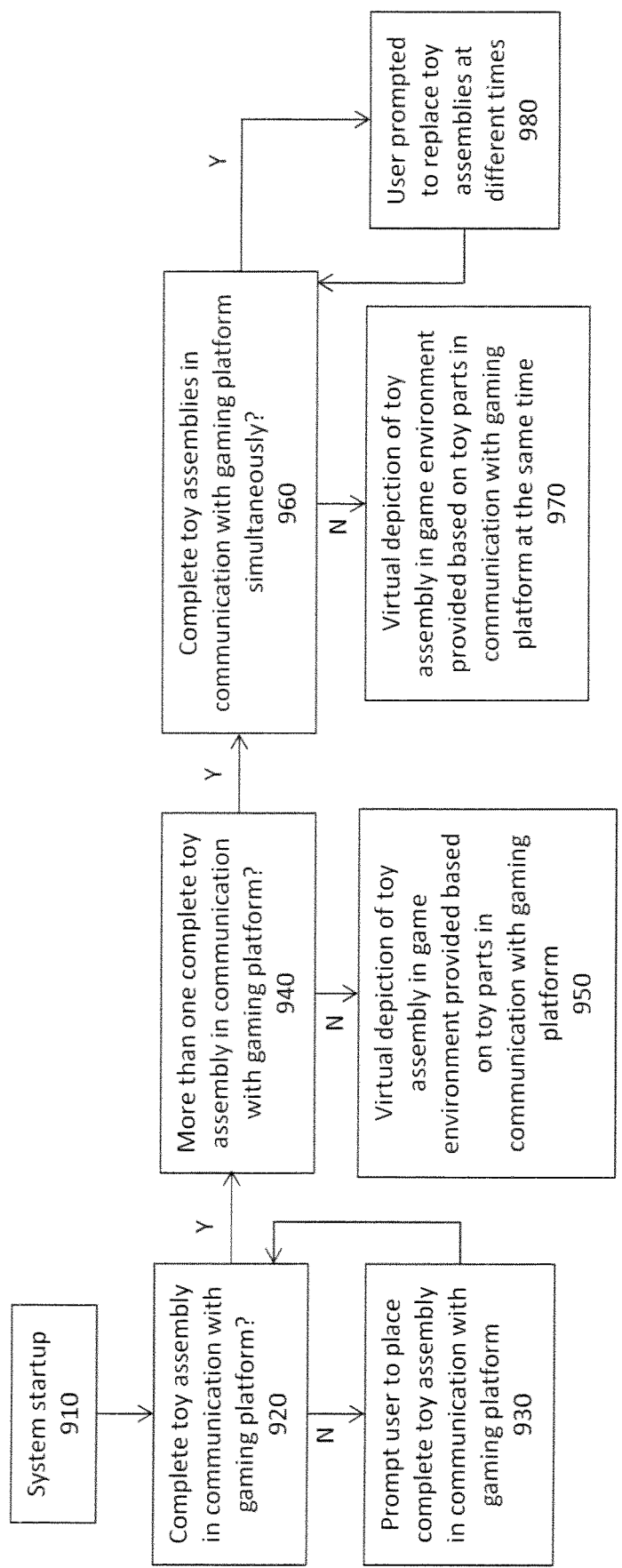
FIG. 9 depicts a flow diagram of a process for identification of one or more toy assemblies by the game platform.

FIG. 9 depicts a block diagram of a process for identification of one or more toy assemblies by the game platform. In the present embodiment, the toy assemblies comprise two parts—a top part and a bottom part. When a top toy part is properly connected to the bottom toy part a complete toy assembly is assembled. In some embodiments, the system will not recognize toy parts that do not comprise a complete toy assembly. In block 910, the system starts up. At this time, the system is capable of communicating with the toy parts and receive identification information for toy parts.

In block 920, the system determines if a complete toy assembly is in communication with the game platform. If no complete toy assembly is detected by the system, the system prompts the user to place a complete toy assembly in communication with the game platform at block 930.

In block 940, the system determines if more than one toy assembly is in communication with the game platform. If only a single complete toy assembly is in communication with the game platform, the system can depict the toy assembly in the game environment for game play in block 950. If multiple complete toy assemblies come into communication with the game platform asynchronously, the system can determine the respective to assemblies based on the timing of the communication of the toy parts with the system in block 970. For example, if first complete toy assembly comprising toy part A and toy part B and a second toy assembly comprising toy part X and toy part Y are in communication with the game system, the game system can determine that the first toy assembly comprises toy part A and toy part B (as opposed to some other combination with toy part X or toy part Y) because toy part A and toy part B are in communication with the system at or about the same time, and toy part X and toy part Y come into communication with the system at a different time. If however the first toy assembly and second toy assembly come into communication with the system at or about the same time in block 960, the system may have difficulty identifying which toy parts constitute the respective toy assemblies, since four or more to parts have been identified by the game platform at or about the same time. In this situation, the user may be prompted to replace the toy assemblies in communication with the system at different times in block 980.

After recognition and identification by the system, toy parts may be associated with player based on the toy part identification number. Therefore, the game can easily recognize two players using the same type of parts and still update each toy's data based on player association.

In other embodiments, more sophisticated RFID chips may be utilized to provide communication between the various toy parts and the game platform. For example, the first toy part may comprise an RFID chip that provides an indication of whether a second toy part is in contact with the first toy part.

Although the invention has been discussed with respect to various embodiments, it should be recognized that the invention comprises the novel and non-obvious claims supported by this disclosure.

What is claimed is:

1. A computer-implemented method for use in providing a video game, comprising:
 receiving information from a plurality of toy parts coupled together to form a toy assembly;
 determining a configuration of the toy assembly based on the information from the plurality of toy parts;
 displaying a virtual character corresponding to the toy assembly for use in the video game based on the determined configuration; and
 conducting video game play using the virtual character;
 wherein the information includes a unique identification and attribute information for each toy part, further including updating the attribute information for each toy part based on the video game play.

2. A computer-implemented method for use in providing a video game, comprising:
 receiving information from a plurality of toy parts coupled together to form a toy assembly;
 determining a configuration of the toy assembly based on the information from the plurality of toy parts;
 displaying a virtual character corresponding to the toy assembly for use in the video game based on the determined configuration; and
 conducting video game play using the virtual character;
 wherein the information includes a unique identification and attribute information for each toy part; and
 wherein the attribute information includes at least health of the toy part.

3. A computer-implemented method for use in providing a video game, comprising:
 receiving information from a plurality of toy parts coupled together to form a toy assembly;
 determining a configuration of the toy assembly based on the information from the plurality of toy parts;
 displaying a virtual character corresponding to the toy assembly for use in the video game based on the determined configuration; and
 conducting video game play using the virtual character;
 wherein the information includes a unique identification and attribute information for each toy part; and
 wherein the attribute information includes at least an experience level of the toy part.

4. A video game system, comprising:
 a game device including a processor, memory storing program instructions for providing for video game play, and a user input device;
 a peripheral device including a surface for placing objects thereon, the peripheral device including a wireless transceiver for communicating with objects placed on the surface, the peripheral device communicatively couplable to the game device; and
 a plurality of toy parts physically combinable into a toy assembly, the toy parts each including an identification of the toy part, at least one of the toy parts including a wireless transceiver for communicating with the peripheral device, at least some of the other of the toy parts including communication elements for communicating with various of the toy parts such that each of the toy parts may communicate their identification to the toy part including the wireless transceiver when combined into the toy assembly, and at least one of the toy parts storing attribute information for a character representing the toy assembly in game play;
 the program instructions for providing for video game play including program instructions for determining if the toy assembly is configured in a valid configuration, program instructions for commanding display of the character representing the toy assembly in game play, the character controllable by a user operating the user input device.

5. The toy assembly of claim 4, wherein the wireless transceiver of the at least one of the toy parts is part of an RFID tag.

6. The toy assembly of claim 4, wherein the communication elements comprise inductive communication elements.

7. The toy assembly of claim 4, wherein the communications elements comprise electrical contacts.

* * * * *